US012005669B2

(12) United States Patent
Bertrand et al.

(10) Patent No.: US 12,005,669 B2
(45) Date of Patent: Jun. 11, 2024

(54) SYSTEM AND METHOD FOR MANUFACTURING A FLEXIBLE INTERMEDIATE BULK CONTAINER

(71) Applicant: TCI MANUFACTURING INC., Fredericton (CA)

(72) Inventors: Paul Bertrand, Fredericton (CA); Louis Bertrand, Fredericton (CA)

(73) Assignee: TCI MANUFACTURING INC., Fredericton (CA)

( * ) Notice: Subject to any disclaimer, the term of this patent is extended or adjusted under 35 U.S.C. 154(b) by 310 days.

(21) Appl. No.: 17/178,564

(22) Filed: Feb. 18, 2021

(65) Prior Publication Data

US 2021/0276297 A1 Sep. 9, 2021

Related U.S. Application Data

(63) Continuation of application No. 16/085,742, filed as application No. PCT/CA2017/050352 on Mar. 20, 2017, now Pat. No. 10,953,621.

(60) Provisional application No. 62/310,210, filed on Mar. 18, 2016.

(51) Int. Cl.
*B31B 70/00* (2017.01)
*B31B 150/00* (2017.01)

(52) U.S. Cl.
CPC .......... *B31B 70/005* (2017.08); *B31B 70/008* (2017.08); *B31B 2150/003* (2017.08)

(58) Field of Classification Search
CPC ................ B31B 70/005; B31B 70/008; B31B 2150/0003; B31B 2150/003
USPC .......................................................... 493/473
See application file for complete search history.

(56) References Cited

U.S. PATENT DOCUMENTS 3,250,187 A 5/1966 Kasting
3,563,000 A 2/1971 Whitehouse et al.
3,579,958 A * 5/1971 Hentges .................. B65B 3/025 53/565

(Continued)

FOREIGN PATENT DOCUMENTS

EP 0653983 5/1995
GB 1073726 6/1967

(Continued)

*Primary Examiner* — Robert F Long
*Assistant Examiner* — Xavier A Madison
(74) *Attorney, Agent, or Firm* — NORTON ROSE FULBRIGHT CANADA LLP

(57) ABSTRACT

A system and method for manufacturing a flexible bulk container. The system includes workstations circumferentially spaced apart from each other. Each of the workstations is operable to perform an operation on a preform of the container. The workstations sequentially modify the preform from an initial version to a final version, the final version of the preform being the manufactured flexible bulk container. A preform manipulation apparatus includes a carrousel disposed centrally and being rotatable about a vertical central axis. Manipulation arms are mounted to the carrousel for common rotation therewith. The manipulation arms each have a proximal end fixed to the carrousel and a distal end having a manipulation tool mounted thereto for seizing and manipulating the preform at each of the workstations. Each of the manipulation arms in operation displaces the manipulation tool and the preform between successive workstations.

13 Claims, 9 Drawing Sheets

(56) References Cited

U.S. PATENT DOCUMENTS

| | | | | |
|---|---|---|---|---|
| 4,713,046 | A | 12/1987 | Dupuy | |
| 4,994,008 | A | 2/1991 | Haake et al. | |
| 5,062,252 | A * | 11/1991 | Kupcikevicius | B65B 31/022 53/512 |
| 5,122,218 | A | 6/1992 | Lapp, Jr. et al. | |
| 5,992,489 | A | 11/1999 | Busse | |
| 7,090,630 | B2 | 8/2006 | Boldrini et al. | |
| 9,809,339 | B2 * | 11/2017 | May | B65B 51/04 |
| 2005/0250633 | A1 | 11/2005 | Boldrini et al. | |
| 2006/0094577 | A1 | 5/2006 | Mannlein et al. | |
| 2007/0142194 | A1 | 6/2007 | Coenen et al. | |
| 2011/0086749 | A1 | 4/2011 | Iglesias | |
| 2011/0232238 | A1 * | 9/2011 | May | B65B 43/50 53/235 |

FOREIGN PATENT DOCUMENTS

| | | |
|---|---|---|
| WO | 2006010732 | 2/2006 |
| WO | 2011064802 | 6/2011 |

* cited by examiner

SYSTEM AND METHOD FOR MANUFACTURING A FLEXIBLE INTERMEDIATE BULK CONTAINER

CROSS-REFERENCE TO RELATED APPLICATIONS

The present application is a continuation of U.S. patent application Ser. No. 16/085,742 filed Sep. 17, 2018, which is a 35 USC 371 application of International patent application PCT/CA2017/050352 filed Mar. 20, 2017, which claims priority on U.S. patent application No. 62/310,210 filed Mar. 18, 2016, the entire contents of all of which are incorporated herein by reference.

TECHNICAL FIELD

The application relates generally to containers for the transport of bulk matter and, more particularly, to systems and methods for manufacturing flexible bulk containers.

BACKGROUND

Bulk containers which are flexible are used to contain and transport bulk matter including, but not limited to, waste material, construction material, soil, aggregate, particulate, loose or granulated solids, powder, etc.

Such flexible bulk containers are commonly known as flexible intermediate bulk containers (FIBCs), although other terms are also used, such as jumbo bags, one ton bag, half ton bag, etc. In most cases, these FIBCs are made from polymer strands or other flexible sheet materials which may have various Denier weight and weaves. Accordingly, the flexible sheet materials which form these containers can be folded and collapsed when not in use, and then expanded into an open bag for use.

Typically, conventional FIBCs are made by hand, or by using minimal automation. They are therefore relatively time consuming to produce, and the quality of such hand-made containers can vary to a degree which may affect the quality of the end product. Furthermore, the use of manual labour and/or minimal automation limits the number of bags that can be manufactured in a given time period, thereby limiting manufacturing efficiency.

SUMMARY

In one aspect, there is provided a system for manufacturing a flexible bulk container, comprising: a plurality of workstations circumferentially spaced apart from each other to form a circumferential array of workstations, each of the workstations operable to perform at least one operation on a preform of the container, each operation modifying the preform, the workstations sequentially modifying the preform from an initial version to a final version, the final version of the preform being the manufactured flexible bulk container; and a preform manipulation apparatus including a carrousel disposed centrally within the circumferential array of workstations and being rotatable about a vertical central axis, a plurality of manipulation arms mounted to the carrousel for common rotation therewith, the manipulation arms each having a proximal end fixed to the carrousel and a distal end having a manipulation tool mounted thereto for seizing and manipulating the preform at each of the workstations, each of the manipulation arms in operation displacing the respective manipulation tool and the preform seized therewith between successive ones of the workstations in the circumferential array of workstations.

There is also provided a system for manufacturing a flexible bulk container, comprising: a plurality of workstations each operable to perform at least one operation on a preform of the container, each operation modifying the preform, the workstations sequentially modifying the preform from an initial version to a final version, the final version of the preform being the manufactured container; and a preform manipulation apparatus having a plurality of displaceable manipulation arms mounted thereto, a distal portion of each arm having a manipulation tool to seize and manipulate the preform at each workstation, each arm in operation displacing the manipulation tool and the preform seized therewith between the workstations.

In another aspect, there is provided a method for forming a flexible bulk container, comprising: i) simultaneously performing at least one operation on a different preform of the flexible bulk container at each of a plurality of workstations, each operation modifying the preform; ii) simultaneously displacing the preforms between adjacent ones of the workstations to perform a next sequential one of the operations thereon; and iii) sequentially repeating steps i) and ii) until a final version of the preform is produced, the final version of the preform corresponding to the formed flexible bulk container.

There is also provided a method for forming a flexible bulk container, comprising: performing at least one operation on a preform of the container to be formed, each operation being performed at one of a plurality of workstations, each operation modifying the preform, and displacing the preform between the workstations to perform operations thereon to produce a final version of the preform, the final version of the preform being the formed container.

BRIEF DESCRIPTION OF THE DRAWINGS

Reference is now made to the accompanying figures in which.

DETAILED DESCRIPTION

Figure 1:
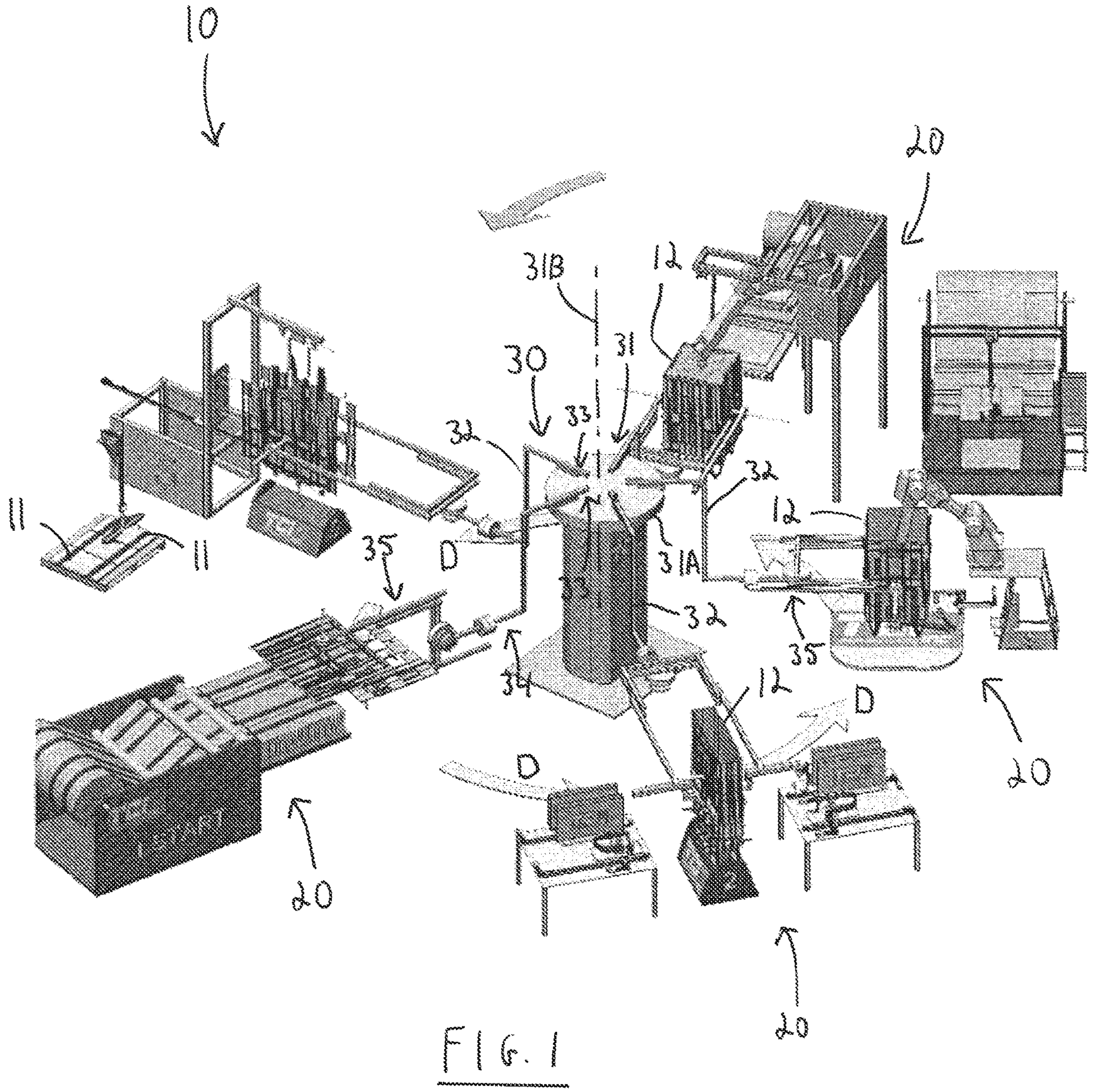
FIG. 1 is a schematic perspective view of a system for manufacturing a flexible bulk container, according to an embodiment of the present disclosure.

FIG. 1 illustrates a system for manufacturing a flexible bulk container 11, the overall system being referred to herein with the reference number 10. The type of the flexible bulk container 11 disclosed herein is a Flexible Intermediate Bulk Container 11, or FIBC 11. It will be appreciated that the system 10 disclosed herein can be used for the manufacture of other flexible bags, carriers, or bulk containers. Some of these other containers are referred to as Jumbo Bag, Jumbo Sack, Super Sack, Big Bag, U-Sac, Tote Bag, One Ton Tote, One Ton Bag, and Half Ton Bag. The FIBC container 11 is in the form of a bag or a sack, and maybe be used to transport any suitable bulk material, such as granulated solids (e.g. soil, sand, grains, powders, pellets, crushed rocks, aggregate, powder, particulate material, etc.), as well as bulkier items (e.g. rocks, waste materials, construction material, bulky objects, etc.). Put simply, the FIBC 11 can be used to store and transport almost any suitable solid item.

The FIBC 11 is made of a flexible fabric. For example, the FIBC 11 can be made from sheets of woven polymer strands, such as strands of polyethylene or polypropylene, either coated or uncoated. The capacity of each FIBC 11 can vary depending on numerous factors such as the strength of the polymer strands, their Denier, their weave, and the manner by which it is loaded and/or transported. Each FIBC 11, although capable of transporting very large loads, is itself relatively lightweight, often weighing no more than a few pounds. Although shown and described herein as an FIBC, it will be appreciated that the flexible bulk container 11 can be other types of flexible containers, and will thus be referred to herein simply as "container 11".

Referring still to FIG. 1, the system 10 performs operations on a preform 12 in order to transform the preform 12 into a usable, or end product, version of the container 11. The term "preform" as used herein refers to a version or form of the container 11 prior to its final usable form. The final usable form is the version of the container 11 sold or used to transport material. More particularly, the container 11 is formed as a result of a number of sequential operations having been performed on the preform 12. It can thus be appreciated that the preform 12 is modified by the system 10 from an initial version in which it bears little resemblance to the container 11, to a final version where the preform 12 is substantially identical to the final version of the container 11.

The present system 10 includes multiple workstations 20 which perform operations on the preform 12 in order to transform it into the container 11. The system 10 also includes preform manipulation apparatus 30 which manipulates the preform 12 at one or more of the workstations 20, and transports it between the workstations 20, so that the manufacturing operations can be performed thereon. The workstations 20 and the preform manipulation apparatus 30 are now described in greater detail.

Each of the workstations 20 performs one or more operations on the preform 12. Each operation on the preform 12 brings it closer to its final vendible and/or usable version. The preform 12 therefore changes as it moves from workstation 20 to workstation 20, and is thus different in shape, size, features, etc. between the workstations 20. The operations therefore modify the preform 12, and at least partially lead to the formation of the container 11. As will be explained in greater detail below with examples of operations performed at the workstations 20, the term "modify" refers to any suitable change performed on the preform 12. For example, modifications made to the preform 12 can include changing its shape, adding components thereto, and folding or packaging it. The workstations 20 act on the preform 12 in a sequential manner. Stated differently, the one or more operations performed at each workstation 20 complement and/or add to the one or more operations performed on the preform 12 at a preceding workstation 20, except of course for the first workstation 20 performing operations on the preform 12.

Still referring to FIG. 1, the preform manipulation apparatus 30 (or simply "apparatus 30") helps to displace the preform 12 between the workstations 20 so that the operations can be performed. The apparatus 30 has a support body 31 which provides the corpus of the apparatus 30 and provides structure thereto. It will be appreciated that the apparatus 30 can have different configurations to displace the preform 12 between the workstations 20.

In the embodiment shown, the support body 31 is centrally-located between the workstations 20. The support body 31 includes a rotatable turret or carrousel 31A, but it will be appreciated that the support body 31 can take other forms. For example, in an alternate embodiment, the support body 31 includes a ski lift type mechanism, which is operable to move each of the preforms 12 between their respective workstations 20, wherein the preforms 12 travel about an oval or oblong trajectory, rather than the circular travel path of the rotatable turret or carrousel 31A of the depicted embodiment. In any event, although the support body 31 is described herein as including a turret or carrousel 31A, it is to be understood that the support body 31 may comprise alternate configurations or include other components. Indeed, the support body 31 of the apparatus 30 can include any body, column, turret, tower or other support structure which can manipulate the preform 12 and/or container 11, and transport it between the workstations 20. The support body 31 is therefore positioned relative to the workstations 20 so that it can accomplish the above-described functionality. In the embodiment shown, the workstations 20 are disposed in a circle about the centrally-located turret or carrousel 31A of the apparatus 30, and the workstations 20 therefore form a circumferential array. The turret or carousel 31A accordingly rotates about a vertical central axis 31B to displace the preforms 12 between successive and circumferentially-adjacent workstations 20, such that the preforms travel between the workstations 20 along a circular travel path. In this embodiment, therefore, the turret or carrousel 31A is disposed substantially concentrically within the circle formed by the plurality of workstations 20, and more particularly, at a center of the circumferential array.

The apparatus 30 includes at least one manipulation arm 32 mounted to the support body 31. In the depicted embodiment, the apparatus 30 includes a plurality of manipulation arms 32. In the depicted embodiment, the number of manipulation arms 32 is equal to the number of workstations 20. In alternate embodiments, the number of manipulation arms 32 are greater or fewer than the number of workstations 20. Each manipulation arm 32 (or simply "arm 32") grips the preform 12 at one or more of the workstations 20 so that the operations can be performed thereon, and then subsequently transports the preform 12 to a subsequent workstation 20. Each arm 32 is displaceable relative to the central carrousel 31A of the apparatus 30 (e.g. towards and away from the central carrousel 31A). As will be explained in greater detail below, each arm 30 can have multiple degrees of freedom, allowing the arm 32 (and the preform 12 seized thereby) to translate and/or rotate in a number of different degrees of freedom respectively. This movement of the arm 32 helps to position and orient the preform 12 as required at each workstation 20.

Each arm 32 is also displaceable between the workstations 20. Each arm 32 may itself move between the workstations 20, or may be displaced by the apparatus 30 between the workstations 20. In the embodiment of FIG. 1, a proximal end 33 of each arm 32 is attached to the carrousel 31A. As the carrousel 31A rotates about the vertical central axis 31B along direction D, the proximal end 33 of each arm 32, and thus the arms 32 themselves, are also rotated along direction D toward the next workstation 20.

The duration of time spent by each preform 12 at each workstation 20 is referred to as an operation cycle. In the depicted embodiment, the operation cycle is the same at each workstation 20, such that the time spent by each arm 32 at each workstation 20 is substantially the same. This allows an arm 32 at a given workstation 20 to work at that workstation 20 in a simultaneous manner with the arms 32 at the other workstations 20. Therefore, although some operations at some workstations 20 may take longer than other operations at other workstations 20, the time spent by the preform 12 at each workstation 20 remains the same. The preforms 12 at each workstation 20 are thus transported to the subsequent workstations 20 at the same time, as the carrousel 31A rotates by an angular displacement corresponding to the circumferential spacing of the workstations 20. In an alternate embodiment, the operation cycle varies at each workstation 20, such that the time each arm 32 spends at each workstation 20 is not the same. In such an embodiment, a given arm 32 and preform 12 may therefore spend more time at some workstations 20 while spending less time at others. In such an embodiment, the arms 32 are independently mobile relative to their common central carrousel 31A, in that all arms 32 need not all rotate simultaneously to the next workstation 20, provided that any arms 32 do not conflict or interfere with adjacent arms 32.

A distal end 34 of each arm 32, opposite its proximal end 33, has a manipulation tool 35. The manipulation tool 35 seizes the preform 12 and holds it while the operations are being performed thereon. The manipulation tool 35 also manipulates the preform 12. The term "manipulate" refers to the handling of the preform 12. For example, manipulations made to the preform 12 include, but are not limited to: displacing it, changing its size (e.g. collapsing and expanding the preform 12), changing its orientation (e.g. rotating the preform 12), and changing its shape. Other manipulations are possible. Some workstations 20 may not require the manipulation tool 35 to perform any of the manipulations noted above.

In the embodiment of FIG. 1, each arm 32 has the same manipulation tool 35. The standard or uniform manipulation tool 35 is therefore configured to support the preform 12 at all workstations 20 irrespective of the operation being performed on the preform 12. This standardisation of the manipulation tool 35 reduces costs for assembling the system 10, and facilitates maintenance. In an alternate embodiment, the manipulation tool 35 of at least one of the arms 32 is different from the manipulation tool 35 of one or more of the other arms 32.

Figure 2A:
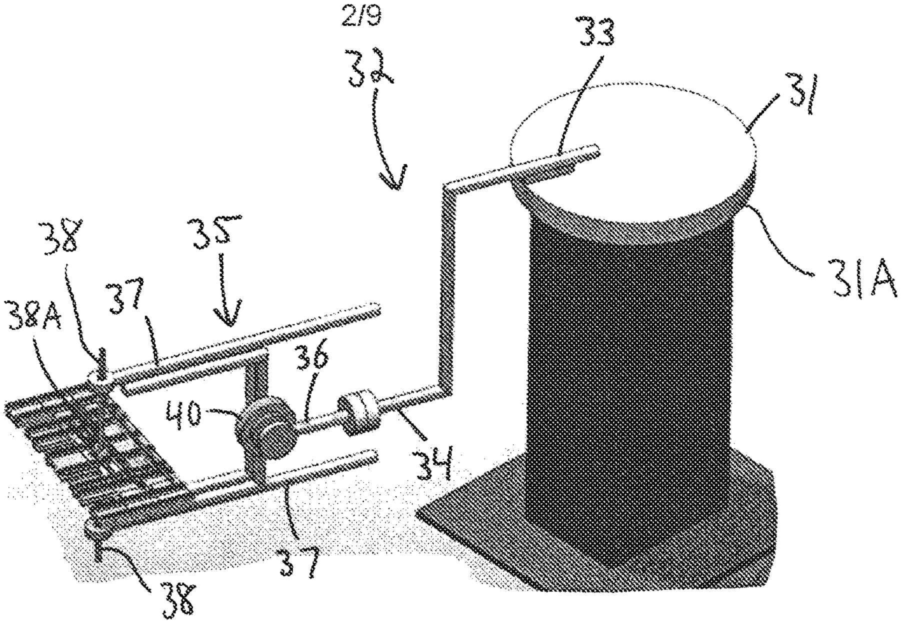
FIG. 2A is a perspective view of a support body and manipulation arm of the system of FIG. 1.
Figure 2B:
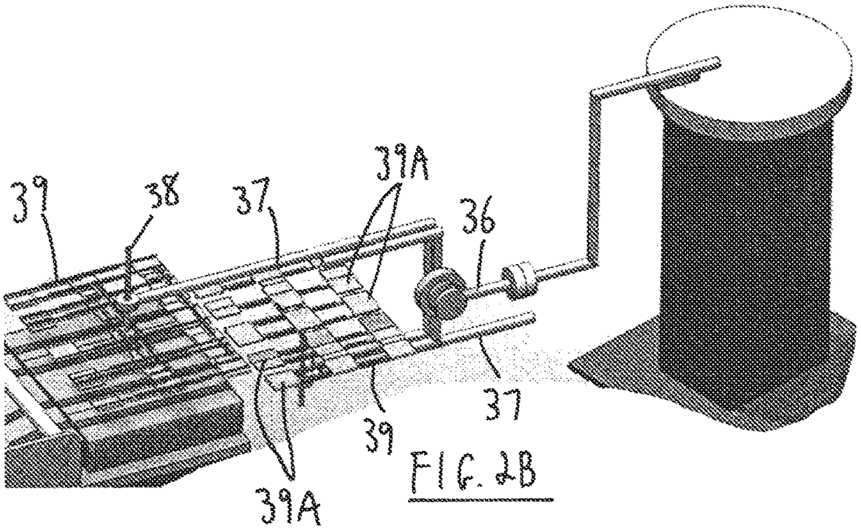
FIG. 2B is another perspective view of the manipulation arm of FIG. 2A.
Figure 2C:
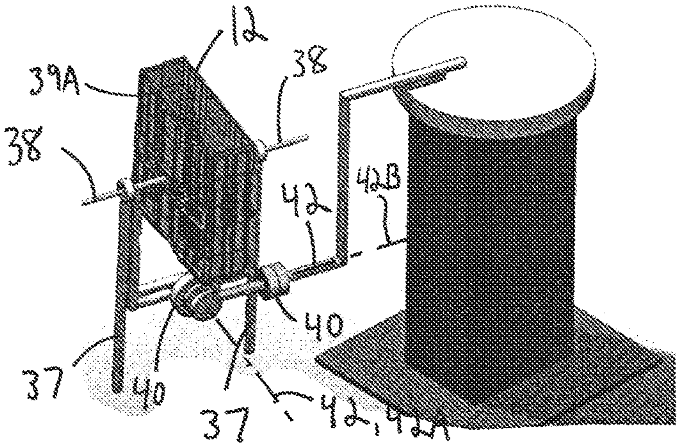
FIG. 2C is yet another perspective view of the manipulation arm of FIG. 2A, the manipulation arm shown seizing and manipulating a preform of the flexible bulk container.

The arm 32 and its manipulation tool 35 are described in greater detail with reference to FIGS. 2A to 2C. The proximal end 33 is shown attached to the carrousel 31A and is rotatable therewith, while the distal end 34 of the arm 32 is spaced apart from the carrousel 31A. An embodiment of the manipulation tool 35 is shown attached to the distal end 34 of the arm 32. Another embodiment of the manipulation tool 35 is described in greater detail below.

The manipulation tool 35 has a base member 36 which supports one or more translatable members 37. Each translatable member 37 is extendable away from, and towards, the base member 36 (as shown in FIG. 2B). This allows the preform 12 that is seized by the manipulation tool 35 to be displaced towards and away from the corresponding workstation 20. In the depicted embodiment, the manipulation tool 35 has two translatable members 37, where each one is actionable independently of the other. An expansion rod 38 extends from an extremity of each translatable member 37. The expansion rod 38 may include an actuated cylinder, such as a threaded cylinder, hydraulic, pneumatic, or electric actuator, etc. The threaded cylinder is rotatable within a corresponding threaded bore of the translatable member 37 in order to expand and contract the preform 12. This allows the preform 12 to be moved between a compact position where the preform 12 is unexpanded, and an expanded position where the preform 12 is expanded, as well as all possible positions therebetween.

A distal, free end 38A of each expansion rod 38 includes a gripping tool 39 which grips the preform 12. The gripping tool 39 in this embodiment includes a plurality of suction grip pads 39A. Each suction grip pad 39A creates a negative pressure at its surface, which causes the materials of the preform 12 against which it is placed to be drawn to this surface. This holds the preform 12 against the suction grip pad 39A. As the expansion rod 38 is expanded outward, the suction grip pads 39A cling to the material of the preform 12 and cause it to expand as well (as shown in FIG. 2C), thereby changing its shape.

The manipulation tool 35 also has one or more rotatable members 40 configured for rotating the preform 12. Each rotatable member 40 is a mechanism operable to provide a rotational output, and a rotation axes 42 about which the preform 12 may rotate. In the embodiment shown, for example, one of the rotatable members 40 is configured to rotate the preform 12 about a first rotation axis 42A, while the other rotatable member 40 is configured to rotate the preform 12 about a second rotation axis 42B. The first and second rotation axes 42A,42B are transverse to one another. Stated differently, the first and second rotation axes 42A,42B are normal to non-parallel planes. The one or more rotatable members 40 allow the manipulation tool 35 to orient the preform 12 as desired at the workstations 20. The components of the manipulation tool 35 described above are powered or moved by any suitable mechanism.

At least some of the workstations 20 of the present disclosure are now described with reference to FIGS. 3A to 7C. It will be appreciated that other workstations are also within the scope of the present disclosure.

Figure 3A:
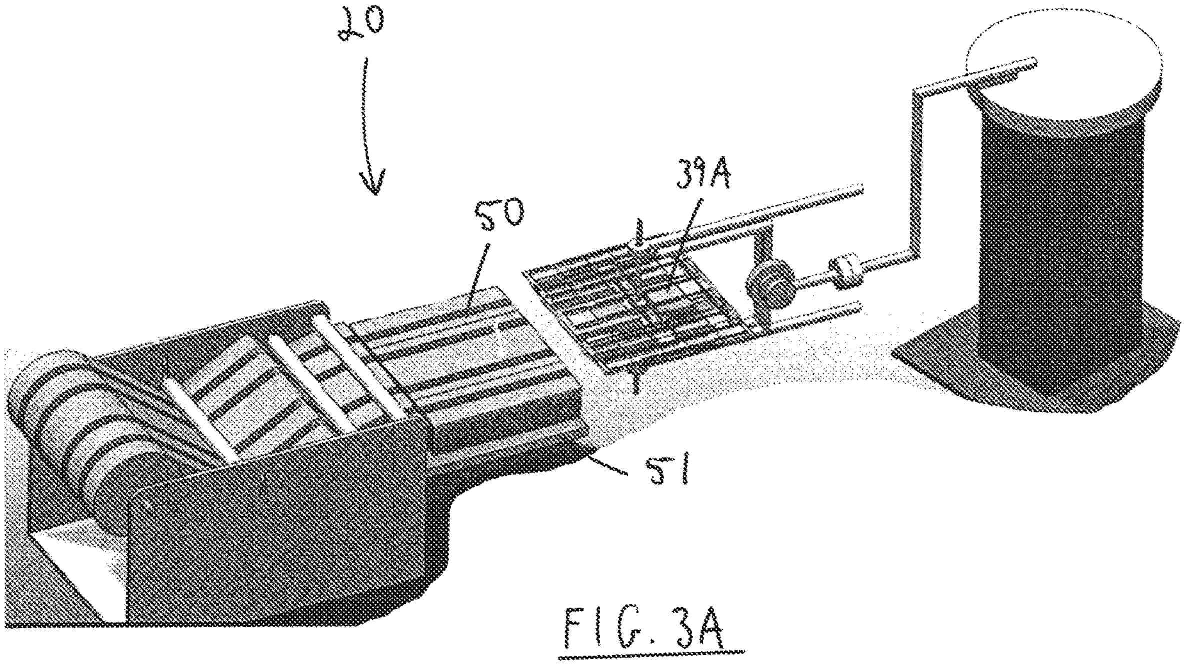
FIG. 3A is a perspective view of a bag sizing and shaping workstation of the system of FIG. 1.
Figure 3B:
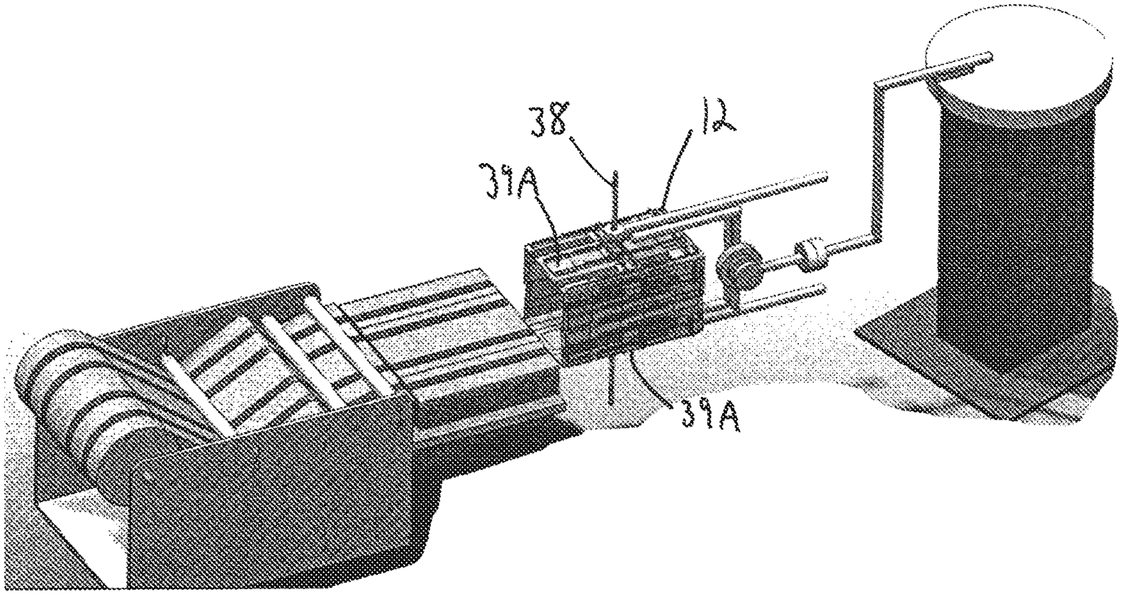
FIG. 3B is another perspective view of the bag sizing and shaping workstation of FIG. 3A.

Referring more particularly to FIGS. 3A and 3B, a workstation 20 for performing the operation of container sizing and shaping is shown. The preform 12 at this workstation 20 consists essentially of a sheet 50 of woven polymer strands that is pre-folded flat, and which will form the sides of the container. The sheet 50 may be another material as well. In the depicted embodiment, the sheet 50 is a fabric having a tubular form. Other materials and shapes are possible. The preform sheet 50 is open at both its ends. An upper set of the suction grip pads 39A seizes the sheet 50 from the sheet tray 51 and lifts it away from the sheet tray 51. A lower set of the suction grip pads 39A is then attached to another surface of the sheet 50 (as shown in FIG. 3A). The upper and lower grip pads 39A are then pulled apart by the expansion rod 38, causing the sheet 50 to assume the form of the preform 12 by taking on a desired size and shape of the container (as shown in FIG. 3B). In this embodiment, the operation of container sizing and shaping is the first operation performed on the preform 12.

Figure 4A:
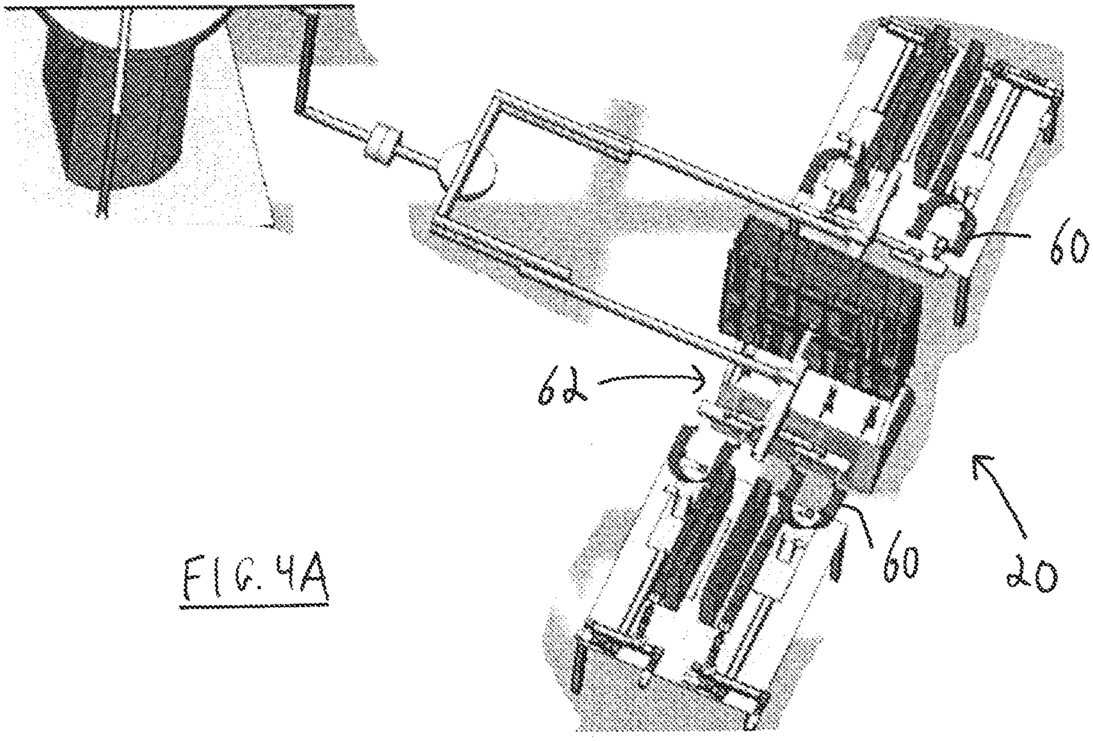
FIG. 4A is a perspective view of a handle attachment workstation of the system of FIG. 1.
Figure 4B:
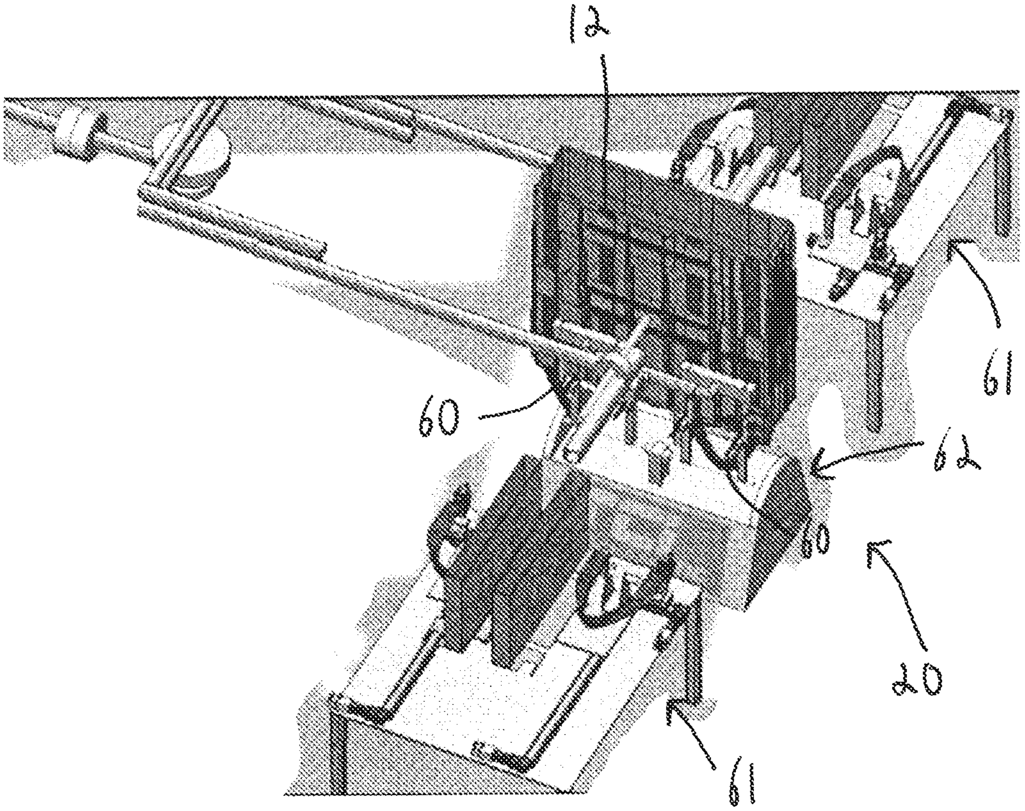
FIG. 4B is another perspective view of the handle attachment workstation of FIG. 4A.

Referring to FIGS. 4A and 4B, a workstation 20 for performing the operation of handle attachment is shown. The preform 12 at this workstation 20 consists essentially of the open box-shape from the previous workstation (see FIGS. 3A and 3B). Multiple handles 60 or loops are formed by a handle forming apparatus 61. The handles 60 are used to transport and load the filled bulk container 11. In the embodiment shown, four handles 60 are attached to the preform 12, and are aligned in pairs. A loader can be inserted through aligned handles 60 to lift the container 11.

The handles 60 are placed against an outer surface of the preform 12. They may be twisted or otherwise manipulated before being permanently attached to the preform 12. An attachment machine 62 attaches the ends of each handle 60 to the preform 12. The attachment machine 62 may sew, adhere, or weld the ends of the handle 60 to the preform 12. The attachment machine 62 may attach other portions of the handle 60 to the preform 12. The four handles 60 can be simultaneously formed, positioned, and attached to the preform 12. The preform 12 leaves this workstation 20 as an open box-shaped body with handles 60 attached thereto.

Figure 5A:
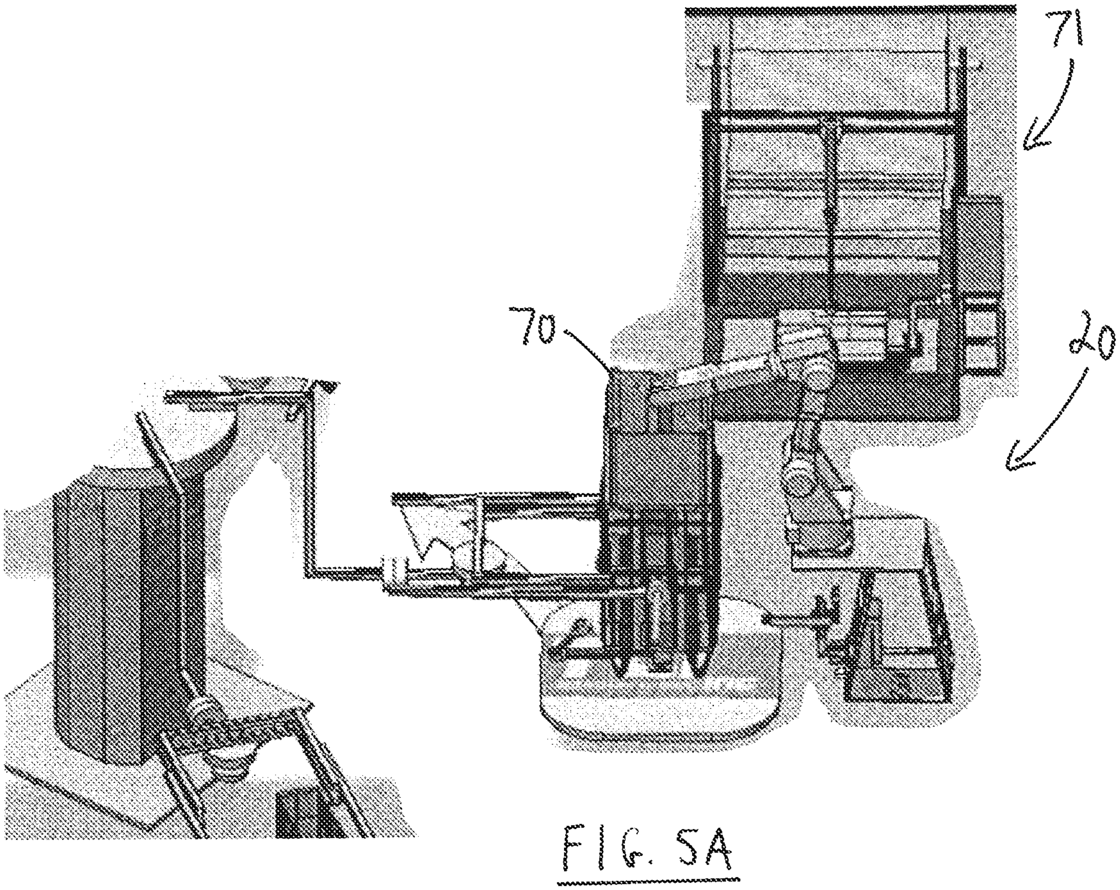
FIG. 5A is a perspective view of a duffle insertion workstation of the system of FIG. 1.
Figure 5B:
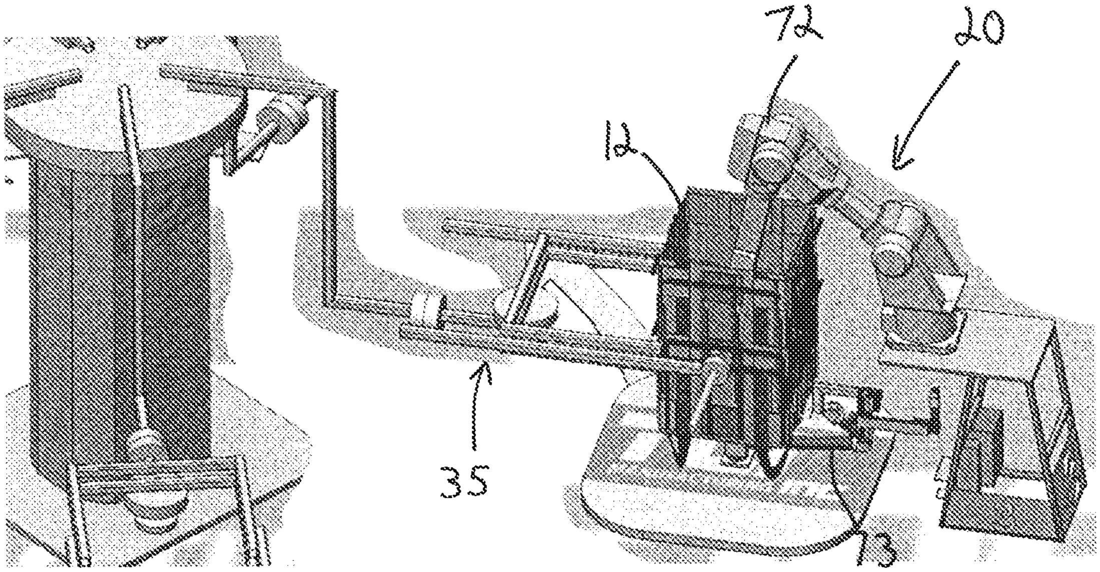
FIG. 5B is another perspective view of the duffle insertion workstation of FIG. 5A.

Referring to FIGS. 5A and 5B, a workstation 20 for performing the operation of duffle insertion is shown. A duffle 70 is inserted into a top of the preform 12, here shown near the handles. The duffle 70 may also be inserted into a bottom of the preform 12. If needed, the preform 12 can be resized by the manipulation tool 35 to accommodate the size of the duffle 70. The duffle 70 can form a top of the container, and helps to close the container once it has been filled with the bulk materials. The duffle 70 top may require a tie string sewn to it in order to close the container once filled. The tie string can be attached, sewn, glued etc. toward the top of the duffle 70 and acts as the closing mechanism of the duffle top.

The duffle 70 is formed by a duffle forming apparatus 71. The duffle forming apparatus 71 forms each duffle 70 from a sheet of suitable material. The sheet may also be a tubular fabric. The duffle forming apparatus 71 attaches the tie string to the duffle 70 top from the inside because once the duffle 70 top is peeled from the inside of the container, the tie string will be located on the outside of the duffle 70 top and can then be used to close the duffle 70 top. The duffle forming apparatus 71 may then grab the tubular sheet from the inside and put it into a form that will permit the attachment of the tie string on the inside of the duffle 70 top. The duffle forming apparatus 71 will then reduce the overall shape of the duffle 70 in order to insert same into the preform 12.

Once so formed, the duffle 70 is inserted into the preform 12 with a robotic arm 72. An edge of the duffle 70 is aligned with an edge of the top of the preform 12 prior to sewing. A sewing arm 73 then applies stitching around the outside or inside of the preform 12 to attach the duffle 70 thereto. The preform 12 leaves this workstation 20 as an open box-shaped body with external handles and an internal duffle 70. If desired, appropriate labelling can also be attached to the outside of the preform 12 at this workstation 20 by the sewing arm 73. For example, a specification tag and/or document pouch can be attached to the preform 12.

Figure 6A:
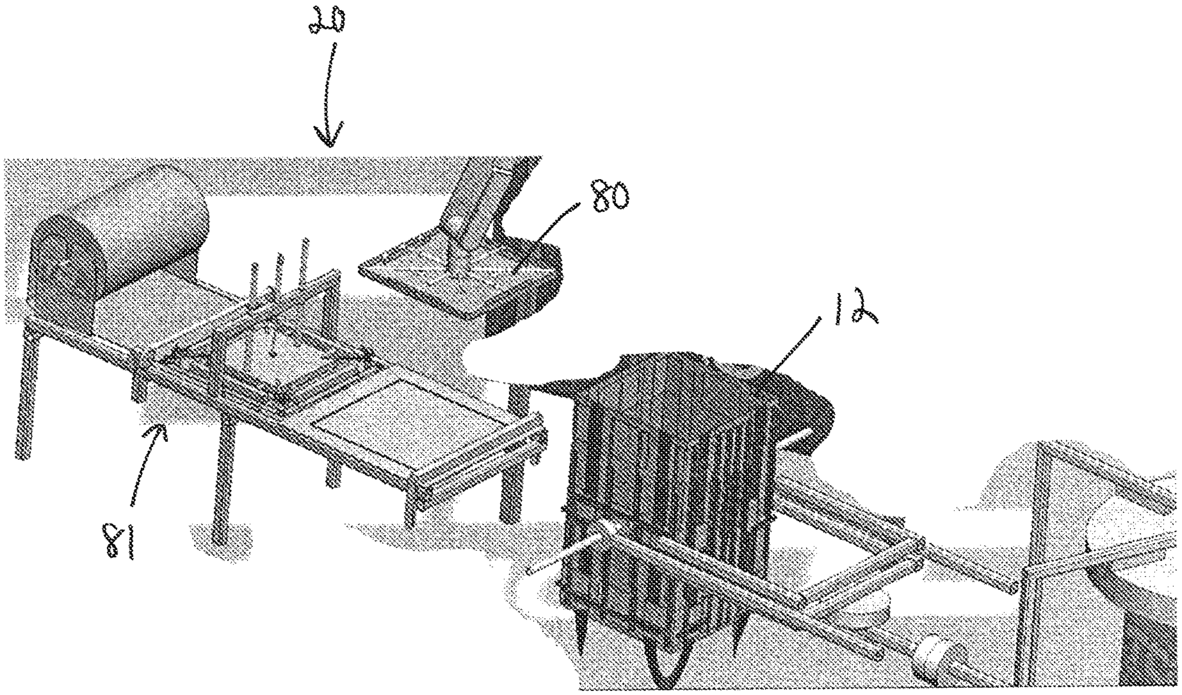
FIG. 6A is a perspective view of a bottom attachment workstation of the system of FIG. 1.
Figure 6B:
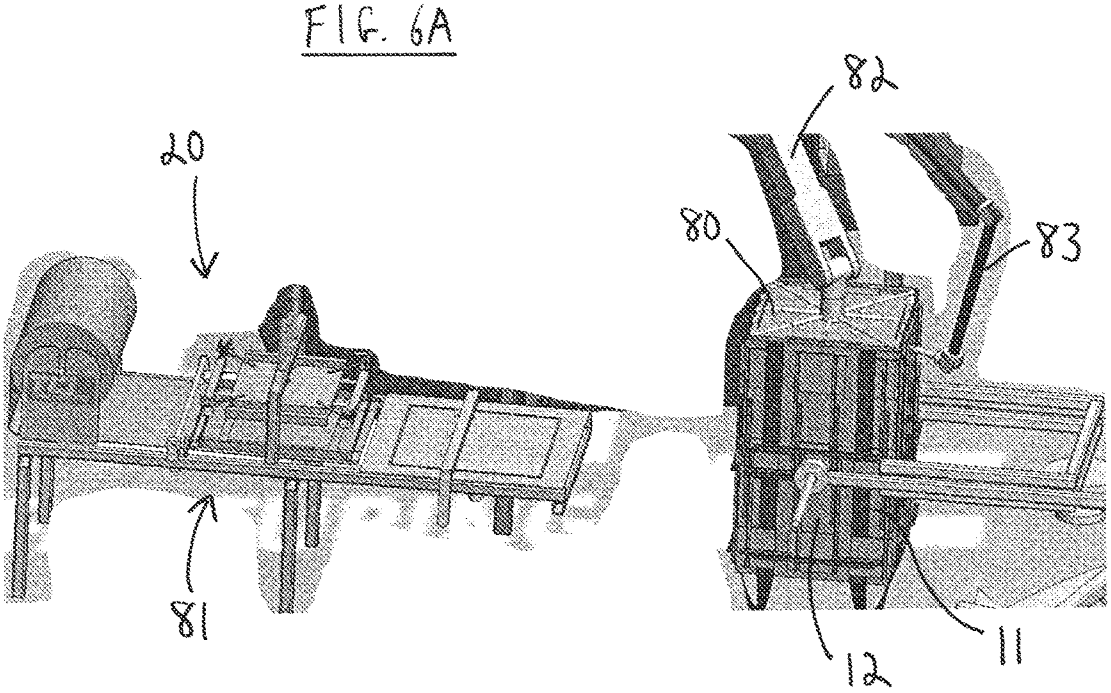
FIG. 6B is another perspective view of the bottom attachment workstation of FIG. 6A.

Referring to FIGS. 6A and 6B, a workstation 20 for performing the operation of bottom attachment is shown. A piece of woven polymer fabric is attached to the bottom of the preform 12, and is thus designated as a bottom 80. The bottom 80 may be made from the same material as the rest of the preform 12, or from a different material. The bottom 80 may be made stronger than the rest of the preform 12 in order to support greater loads experienced at the bottom of the filled container 11.

The bottom 80 is formed by a bottom forming apparatus 81. The bottom forming apparatus 81 forms each bottom 80 from a sheet of suitable material. More particularly, the forming apparatus 81 will fold the four edges of the sheet ninety degrees. The length of the folded edge can vary. In all four corners, the folded fabric can protrude outward and can have a pleat or a crease starting at a point where both sides meet and continue towards the corner of the fabric. Before the bottom 80 is attached to the body of the preform 12, the bottom 80 will be flat with all four sides having an edge all around. The edge will be at a 90 degree angle and may vary in height. The protruded edges of the bottom 80 are pushed to the side of one of the edges before the bottom 80 is inserted into the preform 12.

The formed bottom 80 is inserted into the preform 12 with a robotic arm 82 along a bottom portion of the preform 12. The bottom 80 will be inserted into the preform 12 in a way that the edges of the preform 12 and the edges of the bottom 80 meet. Then both edges will be folded together once or twice before they are sewn. A sewing arm 83 then applies stitching to attach the bottom 80 to the preform 12. The preform 12 leaves this workstation 20 as an open-top box-shaped body with external handles and an internal duffle.

After this workstation, the preform 12 may have achieved its final version, and may therefore be put to use as the container 11. It may also be desired to perform additional operations on the preform 12 in order to facilitate its storage.

Figure 7A:
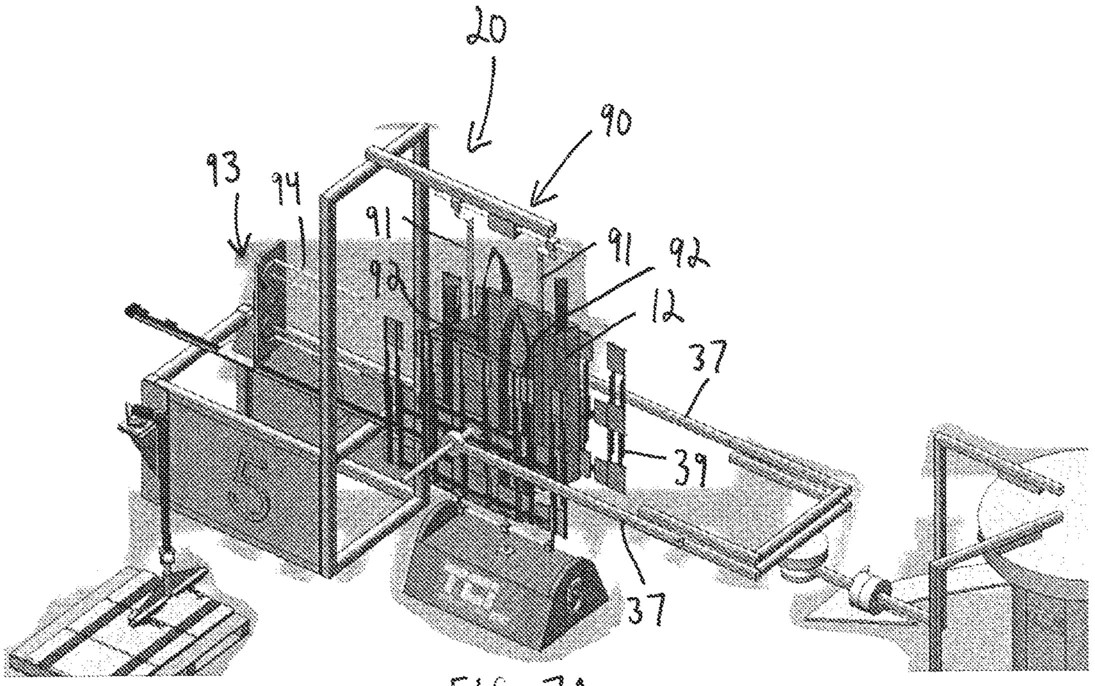
FIG. 7A is a perspective view of a folding and storage workstation of the system of FIG. 1.
Figure 7C:
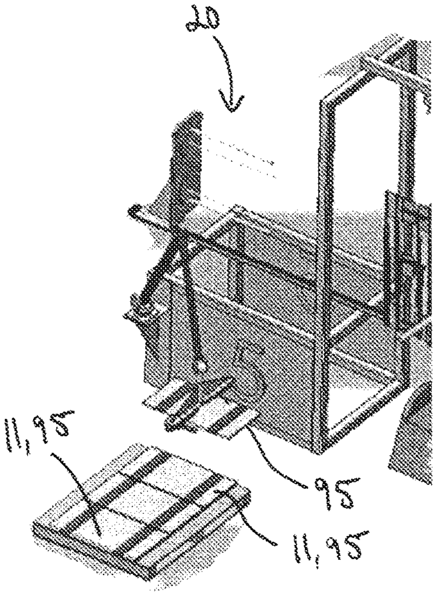
FIG. 7C is a perspective view of the folded flexible bulk container of FIG. 7B being stored with other folded flexible bulk containers.
Figure 7B:
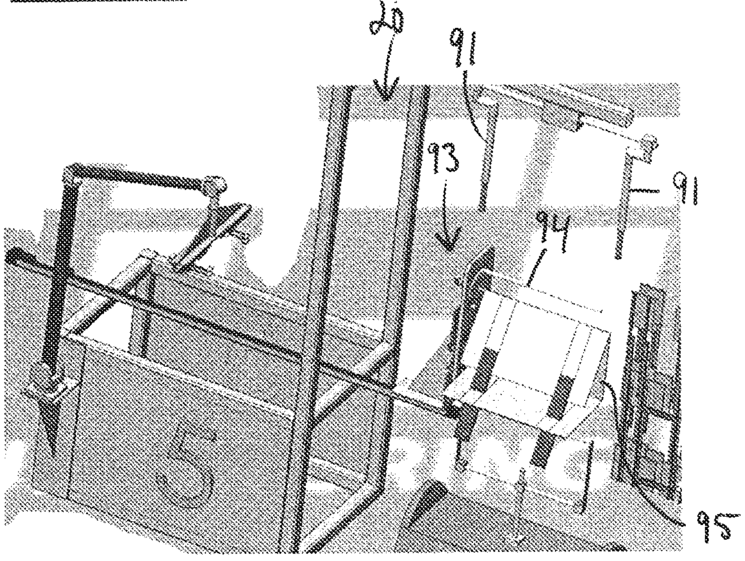
FIG. 7B is another perspective view of the folding and storage workstation of FIG. 7A, showing the flexible bulk container in a folded configuration.

For example, and referring to FIGS. 7A to 7C, a workstation 20 for performing the operation of folding and storage is shown. A creasing apparatus 90 has crease arms 91 which engage a side of the preform 12. The crease arms 91 are drawn towards one another while the translatable members 37 move towards one another to squeeze the preform 12. This creates a crease 92 in the preform 12. This action continues until the preform 12 is pressed flat by the gripping tool 39.

A folding tool 93 is inserted into the crease 92. Folding arms 94 of the folding tool 93 fold the preform 12 on itself and make a compact preform 95 (as shown in FIG. 7B). This compact preform 95, which is essentially the container 11 at this point, is stored with other compact preforms 95 (as shown in FIG. 7C).

Figure 8:
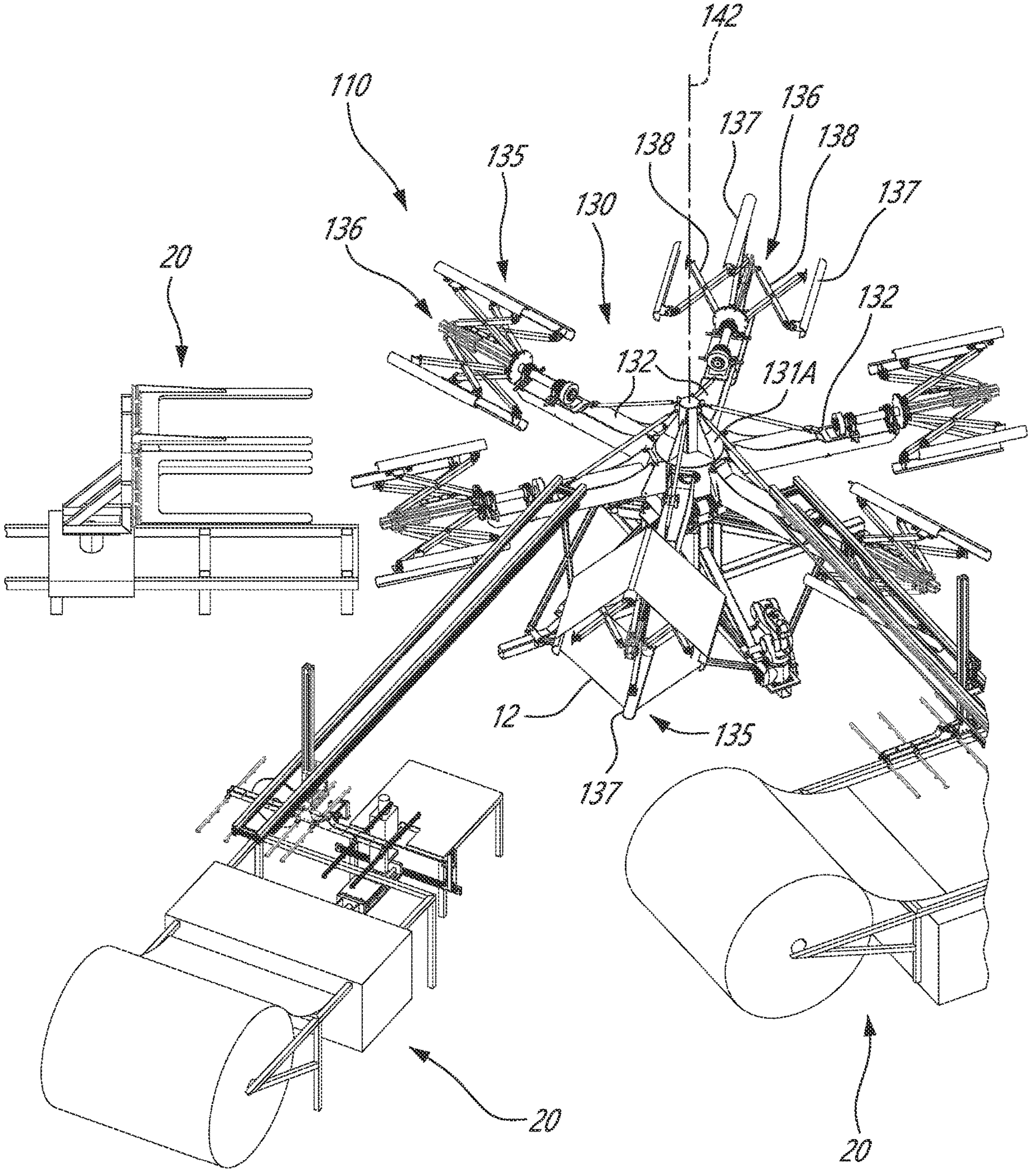
FIG. 8 is a schematic perspective view of a system for manufacturing a flexible bulk container, according to another embodiment of the present disclosure.

Another embodiment of the system 110 for manufacturing a flexible bulk container 11 is shown in FIG. 8. The system 110 includes similar workstations 20 to those of the embodiment of the system 10 described above, and these will therefore not be described in greater detail below.

The preform manipulation apparatus 130 of the system 110 includes a central rotatable turret or carrousel 131A from which multiple manipulation arms 132 extend. The manipulation tool 135 of each arm 132 in the depicted embodiment includes an expandable frame 136. The preform 12 is mounted about the components of the expandable frame 136, and the expandable frame 136 is configured to expand and contract the preform 12. In the depicted embodiment, the expandable frame 136 includes multiple frame members 137 which engage the preform 12. The expandable frame 136 also includes expansion members 138 acting against each frame member 137. The expansion members 138 are actuated to move outwardly from the arm 132, and toward the arm 132. This causes the attached frame members 137 to also move relative to the arm 132 to expand and contract the preform 12 mounted thereon. Each of the frame members 138 may include gripping features such as hooks or suction pads to better seize the preform 12. In the depicted embodiment, each expandable frame 136 and its components are rotatable about a single axis 142 of rotation. This allows the arm 132 to present the preform 12 in the desired orientation to the workstation 20.

Figure 9A:
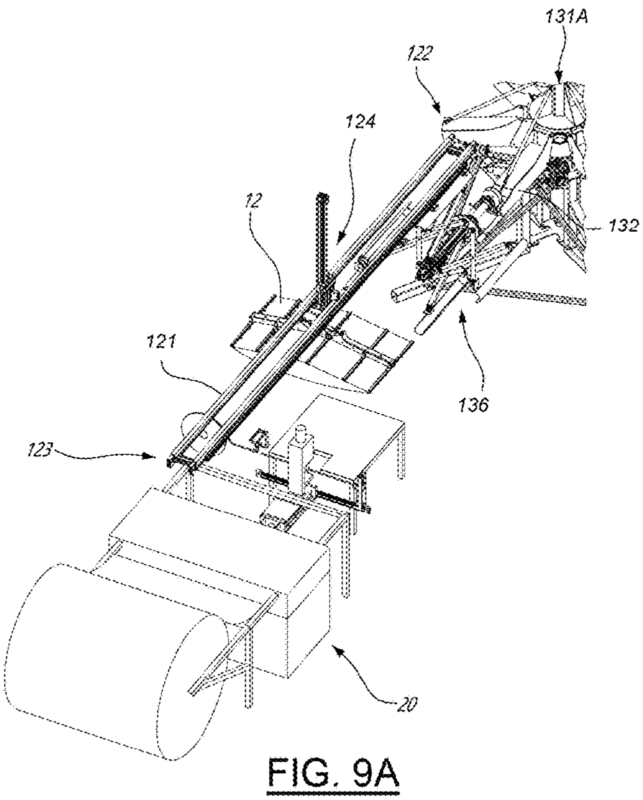
FIG. 9A is a perspective view of a guide member and a transport member of the system of FIG. 8.
Figure 9B:
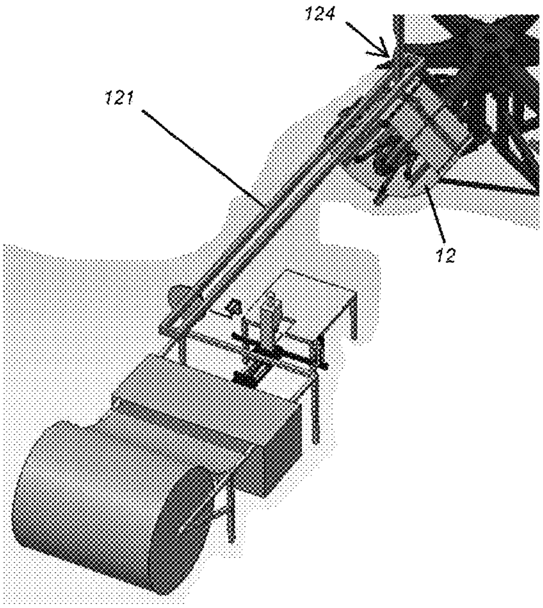
FIG. 9B is another perspective view of the guide member and the transport member of FIG. 9A, showing the perform in an initial position.
Figure 9C:
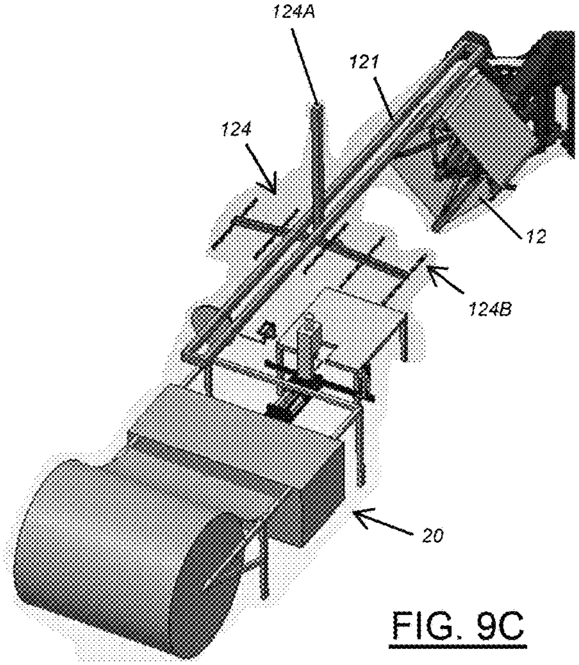
FIG. 9C is another perspective view of the guide member and the transport member of FIG. 9A, showing the perform in an expanded position.

Referring to FIGS. 9A to 9C, the arms 132 do not translate towards and away from the workstations 20. Stated differently, the expandable frame 136 remains in a fixed position with respect to the rotatable turret or carrousel 131A of the preform manipulation apparatus 130. To move the preform 12 between the rotatable turret or carrousel 131A and each workstation 20, one or more workstations 20 are provided with an overhead guide member 121. Each guide member 121 is rail, track, or other elongated body which extends between the rotatable turret or carrousel 131A and the corresponding workstation 20, and which guides the displacement of the preform 12 therebetween. More particularly, a first end 122 of each guide member 121 is disposed adjacent to the expandable frame 136 of each arm 132, and a second end 123 of each guide member 121 is disposed adjacent to the workstation 20. The workstations 20 with the guide member 121 also include a transport member 124 which displaces along the guide member 121 and which is operable to seize the preform 12 and displace it between the workstation 20 and the rotatable turret or carrousel 131A. In the depicted embodiment, each transport member 124 includes a guide arm 124A engaged with the guide member 121 to be displaced therealong. A distal end of the guide arm 124A has a seizing mechanism 124B to grip the preform 12 in order to transport it between the rotatable turret or carrousel 131A and the corresponding workstation 20. In the depicted embodiment, the rotatable turret or carrousel 131A rotates the arms 132 to align the expandable frame 136 with each guide member 121.

Referring to FIG. 1, there is also disclose a method for forming the flexible bulk container 11. The method includes simultaneously performing at least one operation on a different preform 12 of the flexible bulk container 11 at each of a plurality of workstations 20. Each operation modifies the preform 12. The method also includes simultaneously displacing the preforms 12 between adjacent ones of the workstations 20 to perform a next sequential one of the operations thereon. The method also includes sequentially repeating the preceding steps until a final version of the preform 12 is produced. The final version of the preform 12 corresponds to the formed flexible bulk container 11.

It can thus be appreciated that the system 10,110 and method disclosed herein allow for the automated manufacture of FIBC containers 11, for example. Such automation can allow for improved productivity, lower defects, and lower unit costs, when compared to conventional manual or minimal automation techniques.

Although presented above in a given order, the workstations 20 disclosed herein may perform the operations described above according to a different sequence. Furthermore, the system 10,110 may include additional workstations 20, or the workstations 20 may perform additional operations. Some of these additional workstations 20 and/or additional operations include workstations 20 to add a spout top, a spout bottom, a flat top, and an open top.

The workstations 20 and the operations performed thereby are described separately to facilitate comprehension of their functionality. It will be appreciated that one or more workstations 20, or the operations performed thereby, may be combined into a single workstation 20 if desired. Similarly, each of the operations described herein can be broken down into different sub-operations.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A system for manufacturing a flexible bulk container, comprising:

a plurality of workstations spaced apart from each other to form an array of workstations, each of the workstations operable to perform at least one operation on a preform of the container over a period of time defined as an operation cycle, each operation modifying the preform, the workstations sequentially modifying the preform from an initial version to a final version, the final version of the preform being the manufactured flexible bulk container; and a preform manipulation apparatus to displace the preform between the array of workstations, a plurality of manipulation arms each having a distal end having a manipulation tool mounted thereto for seizing and manipulating the preform at each of the workstations, the manipulation tool of each manipulation arm including at least a translatable member to displace the preform towards and away from each workstation during the operation cycle, one or more of the manipulation tools being expandable between a compact position and an expanded position to expand the preform during the operation cycle, each of the manipulation arms in operation displacing the respective manipulation tool and the preform seized therewith between successive ones of the workstations in the array of workstations;

wherein the manipulation tool of each manipulation arm includes at least one rotatable member to modify an orientation of the preform over the operation cycle, and the at least one rotatable member includes a first rotatable member and a second rotatable member, the first rotatable member operable to rotate the preform about a first axis, the second rotatable member operable to rotate the preform about a second axis, the first axis being transverse to the second axis.

2. The system as defined in claim 1, wherein each manipulation arm has the same manipulation tool.

3. The system as defined in claim 1, wherein the manipulation tool of each manipulation arm is expandable between the compact position and the expanded position.

4. The system as defined in claim 1, wherein each workstation is operable to perform only one operation on the preform over the operation cycle, the operation cycle for each operation being the same at all the workstations.

5. The system as defined in claim 1, wherein the number of manipulation arms corresponds to the number of workstations in the array of workstations.

6. The system as defined in claim 1, wherein the manipulation tool of each arm includes a gripping tool to seize the preform and change a shape thereof during the operation cycle.

7. The system as defined in claim 1, wherein the manipulation tool of each manipulation arm includes an expandable frame being rotatable about an axis of rotation, the expandable frame remaining in a fixed position with respect to a support body of the preform manipulation apparatus.

8. The system as defined in claim 1, wherein the plurality of workstations includes a bag sizing and shaping workstation operable to modify a sheet of the preform to a size and a shape of the manufactured flexible bulk container.

9. The system as defined in claim 1, wherein the plurality of workstations includes a handle attachment workstation operable to attach at least one handle to the preform.

10. The system as defined in claim 1, wherein the plurality of workstations includes a duffle insertion workstation operable to attach a duffle to the preform.

11. The system as defined in claim 1, wherein the plurality of workstations includes a bottom attachment workstation operable to attach a bottom to the preform.

12. The system as defined in claim 1, wherein the plurality of workstations are circumferentially spaced apart from each other to form a circumferential array of workstations, the preform manipulation apparatus including a carrousel disposed centrally within the circumferential array of workstations and being rotatable about a vertical central axis.

13. A system for manufacturing a flexible bulk container, comprising:

a plurality of workstations linearly spaced apart from each other to form an array of workstations, each of the workstations operable to perform at least one operation on a preform of the container over a period of time defined as an operation cycle, each operation modifying the preform, the workstations sequentially modifying the preform from an initial version to a final version, the final version of the preform being the manufactured flexible bulk container; and a preform manipulation apparatus to linearly displace the preform between the array of workstations, a plurality of manipulation arms each having a distal end having a manipulation tool mounted thereto for seizing and manipulating the preform at each of the workstations, the manipulation tool of each manipulation arm including at least a translatable member to displace the preform towards and away from each workstation during the operation cycle, one or more of the manipulation tools being expandable between a compact position and an expanded position to expand the preform during the operation cycle, each of the manipulation arms in operation displacing the respective manipulation tool and the preform seized therewith between successive ones of the workstations in the array of workstations;

wherein the manipulation tool of each manipulation arm includes at least one rotatable member to modify an orientation of the preform over the operation cycle, and the at least one rotatable member includes a first rotatable member and a second rotatable member, the first rotatable member operable to rotate the preform about a first axis, the second rotatable member operable to rotate the preform about a second axis, the first axis being transverse to the second axis.

* * * * *